United States Patent
Petway et al.

(10) Patent No.: US 9,273,177 B2
(45) Date of Patent: *Mar. 1, 2016

(54) CURING AGENTS PROVIDING A LOW RATIO OF THIN-FILM CURE TIME TO GEL TIME

(75) Inventors: Lorenzo Petway, The Woodlands, TX (US); Derek Scott Kincaid, Spring, TX (US)

(73) Assignee: Huntsman Advanced Materials Americas LLC, The Woodlands, TX (US)

( * ) Notice: Subject to any disclaimer, the term of this patent is extended or adjusted under 35 U.S.C. 154(b) by 129 days.

This patent is subject to a terminal disclaimer.

(21) Appl. No.: 14/116,428

(22) PCT Filed: Jun. 5, 2012

(86) PCT No.: PCT/US2012/040820
§ 371 (c)(1),
(2), (4) Date: Nov. 8, 2013

(87) PCT Pub. No.: WO2012/170370
PCT Pub. Date: Dec. 13, 2012

(65) Prior Publication Data
US 2014/0110055 A1 Apr. 24, 2014

Related U.S. Application Data

(60) Provisional application No. 61/494,496, filed on Jun. 8, 2011.

(51) Int. Cl.
*C08G 59/50* (2006.01)
*C08G 59/18* (2006.01)
*C09J 163/00* (2006.01)
*C09D 163/00* (2006.01)

(52) U.S. Cl.
CPC .............. *C08G 59/184* (2013.01); *C08G 59/50* (2013.01); *C08G 59/5026* (2013.01); *C09D 163/00* (2013.01); *C09J 163/00* (2013.01)

(58) Field of Classification Search
CPC .. C08G 59/50; C08G 59/184; C08G 59/5026; C09J 163/00; C09D 163/00; C08L 63/00
USPC ........... 156/314, 330; 525/523; 523/400, 404; 528/93
See application file for complete search history.

(56) References Cited

U.S. PATENT DOCUMENTS

| | | | |
|---|---|---|---|
| 4,197,389 A * | 4/1980 | Becker | C08G 59/184 428/413 |
| 4,668,736 A | 5/1987 | Robins et al. | |
| 5,318,851 A | 6/1994 | Baron et al. | |
| 5,548,026 A | 8/1996 | Jorissen et al. | |
| 7,615,584 B2 * | 11/2009 | Matthias et al. | 523/404 |
| 7,683,154 B2 | 3/2010 | Volle | |
| 7,816,481 B2 | 10/2010 | Klein et al. | |

FOREIGN PATENT DOCUMENTS

WO WO 2004104130 A2 * 12/2004

OTHER PUBLICATIONS

"Product data sheet Araldite GY 6010" Jun. 2005.*

* cited by examiner

*Primary Examiner* — John Goff

(57) ABSTRACT

The present disclosure relates to a curing agent for a curable resin which is a reaction product obtained from the reaction of a liquid epoxy and a polyamine component. The curing agent may be used as part of a two component curable system for the curing of unmodified epoxy resins.

12 Claims, No Drawings

CURING AGENTS PROVIDING A LOW RATIO OF THIN-FILM CURE TIME TO GEL TIME

CROSS-REFERENCE TO RELATED APPLICATION

Not Applicable.

STATEMENT REGARDING FEDERALLY SPONSORED RESEARCH OR DEVELOPMENT

Not applicable.

FIELD OF THE INVENTION

The present disclosure is directed to curing agents for use in two component curable systems and to articles produced from curing such curable systems.

BACKGROUND OF THE INVENTION

Curable compositions are utilized for providing high quality, permanent bonding or protection in many different commercial and industrial settings. These compositions are especially useful because of their ability to strongly resist corrosion and adhere to a variety of materials, including metal, glass, plastic, wood and fiber.

Two forms of epoxy-based compositions are commercially available. The first form, one component compositions, are available as rigid epoxy compositions, frozen pre-mix flexible epoxy compositions, and room-temperature stable flexible epoxy compositions. While one component compositions provide the convenience of storage as a single component, they also require elevated curing temperatures. The second form, two component compositions, are stored as two separate components that are mixed just prior to application. Two component compositions overcome the often inconvenient curing requirements of one component compositions since they can be cured at room temperature.

Examples of two component epoxy compositions can be found in:

U.S. Pat. No. 4,728,737 which discloses a two component formulation containing (i) an epoxy plus a polyisocyanate or anhydride and (ii) a mixture of amido amines, primary or secondary amines having tertiary amine groups or ether groups in their backbone and bisphenol A;

U.S. Pat. No. 6,248,204 which discloses a room temperature curable two component formulation of an epoxy resin and a polyether amine-based hardener;

U.S. Pat. No. 7,157,143 which describes a two component epoxy adhesive composition containing an epoxy resin and a curing agent, with each component optionally containing a flexibilizer; and U.S. Pat. No. 7,834,091 which discloses a two component adhesive composition consisting of two epoxy resins and an amine compound having a molecular weight of less than 450 g/mol.

One drawback to conventional two component epoxy-based compositions containing amine curing agents for curing at ambient conditions is the cured compositions exhibit less than ideal thin-film cure times and pot lives (gelation time). It is therefore an object of the present disclosure to provide a novel two component curable system containing an amine curing agent which provides a relatively fast thin-film cure time in combination with a long pot life.

SUMMARY OF THE INVENTION

This object has been achieved by a two component curable system comprising:

(A) a curable component comprising an epoxy resin; and
(B) a curing agent component comprising a reaction product obtained from the reaction of a liquid epoxy and a polyamine component consisting of a cycloaliphatic polyamine compound.

The curable systems of the present disclosure, after contacting the curable component and curing agent component and subjecting the mixture to curing conditions, exhibit long pot lives and short thin film cure times such that the ratio of cure-through time to gel time is less than about 6, in some embodiments less than about 5.5 and even in some embodiments less than about 5.

The two component curable system may be used in a variety of applications, for example, in the field of surface protection, as a coating for a substrate, in electrical applications, such as potting and molding compositions, in laminating processes, in the fabrication of castings or of prepregs, in adhesive applications, and in civil engineering applications.

DETAILED DESCRIPTION OF THE INVENTION

If appearing herein, the term "comprising" and derivatives thereof are not intended to exclude the presence of any additional component, step or procedure, whether or not the same is disclosed herein. In order to avoid any doubt, all compositions claimed herein through use of the term "comprising" may include any additional additive, adjuvant, or compound, unless stated to the contrary. In contrast, the term, "consisting essentially of" if appearing herein, excludes from the scope of any succeeding recitation any other component, step or procedure, excepting those that are not essential to operability and the term "consisting of", if used, excludes any component, step or procedure not specifically delineated or listed. The term "or", unless stated otherwise, refers to the listed members individually as well as in any combination.

The articles "a" and "an" are used herein to refer to one or to more than one (i.e. to at least one) of the grammatical object of the article. By way of example, "an epoxy" means one epoxy or more than one epoxy.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phrases do not necessarily refer to the same embodiment.

As used herein the term "cycloaliphatic radical" refers to a radical having a valence of at least one, and comprising an array of atoms which is cyclic but which is not aromatic. Thus, as defined herein a "cycloaliphatic radical" does not contain an aromatic group. A "cycloaliphatic radical" may also comprise one or more noncyclic components. For example, a cyclopentylmethyl group ($C_5H_9CH_2$—) is a $C_6$ cycloaliphatic radical which comprises a cyclopentyl ring (the array of atoms which is cyclic but which is not aromatic) and a methylene group (the noncyclic component). The term "a $C_6$-$C_{20}$ cycloaliphatic radical" includes cycloaliphatic radicals containing at least six but no more than 20 carbon atoms.

If the specification states a component or feature "may", "can", "could", or "might" be included or have a characteristic, that particular component or feature is not required to be included or have the characteristic.

The present invention is generally directed to a two component curable system containing a curable component and a curing agent component and methods of making and using such curable systems. The curing agent components of the present disclosure are reaction products obtained from the reaction of a polyamine component containing a cycloaliphatic polyamine compound and a liquid epoxy. The reaction product may be formed either in the presence or absence of a surfactant and once formed may optionally be diluted in solvent, such as benzyl alcohol. The curable systems of the present disclosure are easily manufactured, may be cured at ambient conditions or under heat and surprisingly exhibit short thin-film cure times in combination with long pot lives. This combination of properties is extremely difficult to achieve in conventional non-water based two component systems which are designed for use in coating and adhesive applications. In preferred embodiments of the present disclosure, the two component systems, after contacting the curable component and curing agent component and subjecting the mixture to curing conditions, exhibit a ratio of cure-through time to gel time of less than about 6, preferably less than about 5.5 and even more preferably less than about 5

According to one embodiment, the system of the present disclosure includes a curable component containing an epoxy resin. In general, any epoxy-containing compound is suitable for use as the epoxy resin in the present disclosure, such as the epoxy-containing compounds disclosed in U.S. Pat. No. 5,476,748 which is incorporated herein by reference. The epoxy resin may be solid or liquid. In one embodiment, the epoxy resin is selected from the group of: a polyglycidyl epoxy compound; a non-glycidyl epoxy compound; an epoxy cresol novolac compound; and an epoxy phenol novolac compound.

The polyglycidyl epoxy compound may be a polyglycidyl ether, poly(β-methylglycidyl)ether, polyglycidyl ester or poly(β-methylglycidyl)ester. The synthesis and examples of polyglycidyl ethers, poly(β-methylglycidyl)ethers, polyglycidyl esters and poly(β-methylglycidyl)esters are disclosed in U.S. Pat. No. 5,972,563, which is incorporated herein by reference. For example, ethers may be obtained by reacting a compound having at least one free alcoholic hydroxyl group and/or phenolic hydroxyl group with a suitably substituted epichlorohydrin under alkaline conditions or in the presence of an acidic catalyst followed by alkali treatment. The alcohols may be, for example, acyclic alcohols, such as ethylene glycol, diethylene glycol and higher poly(oxyethylene)glycols, propane-1,2-diol, or poly(oxypropylene)glycols, propane-1,3-diol, butane-1,4-diol, poly(oxytetramethylene)glycols, pentane-1,5-diol, hexane-1,6-diol, hexane-2,4,6-triol, glycerol, 1,1,1-trimethylolpropane, bistrimethylolpropane, pentaerythritol and sorbitol. Suitable glycidyl ethers may also be obtained, however, from cycloaliphatic alcohols, such as 1,3- or 1,4-dihydroxycyclohexane, bis(4-hydroxycyclohexyl)methane, 2,2-bis(4-hydroxycyclohexyl)propane or 1,1-bis(hydroxymethyl)cyclohex-3-ene, or they may possess aromatic rings, such as N,N-bis(2-hydroxyethyl)aniline or p,p'-bis(2-hydroxyethylamino)diphenylmethane.

Particularly important representatives of polyglycidyl ethers or poly(β-methylglycidyl)ethers are based on monocyclic phenols, for example, on resorcinol or hydroquinone, on polycyclic phenols, for example, on bis(4-hydroxyphenyl)methane (Bisphenol F), 2,2-bis(4-hydroxyphenyl)propane (Bisphenol A), bis(4-hydroxyphenyl)sulfone (Bisphenol S), alkoxylated Bisphenol A, F or S, triol extended Bisphenol A, F or S, brominated Bisphenol A, F or S, hydrogenated Bisphenol A, F or S, glycidyl ethers of phenols and phenols with pendant groups or chains, on condensation products, obtained under acidic conditions, of phenols or cresols with formaldehyde, such as phenol novolaks and cresol novolaks, or on siloxane diglycidyls.

Polyglycidyl esters and poly(P-methylglycidyl)esters may be produced by reacting epichlorohydrin or glycerol dichlorohydrin or β-methylepichlorohydrin with a polycarboxylic acid compound. The reaction is expediently carried out in the presence of bases. The polycarboxylic acid compounds may be, for example, glutaric acid, adipic acid, pimelic acid, suberic acid, azelaic acid, sebacic acid or dimerized or trimerized linoleic acid. Likewise, however, it is also possible to employ cycloaliphatic polycarboxylic acids, for example tetrahydrophthalic acid, 4-methyltetrahydrophthalic acid, hexahydrophthalic acid or 4-methylhexahydrophthalic acid. It is also possible to use aromatic polycarboxylic acids such as, for example, phthalic acid, isophthalic acid, trimellitic acid or pyromellitic acid, or else carboxyl-terminated adducts, for example of trimellitic acid and polyols, for example glycerol or 2,2-bis(4-hydroxycyclohexyl)propane, may be used.

In another embodiment, the epoxy resin is a non-glycidyl epoxy compound. Non-glycidyl epoxy compounds may be linear, branched, or cyclic in structure. For example, there may be included one or more epoxide compounds in which the epoxide groups form part of an alicyclic or heterocyclic ring system. Others include an epoxy-containing compound with at least one epoxycyclohexyl group that is bonded directly or indirectly to a group containing at least one silicon atom. Examples are disclosed in U.S. Pat. No. 5,639,413, which is incorporated herein by reference. Still others include epoxides which contain one or more cyclohexene oxide groups and epoxides which contain one or more cyclopentene oxide groups.

Particularly suitable non-glycidyl epoxy compound's include the following difunctional non-glycidyl epoxide compounds in which the epoxide groups form part of an alicyclic or heterocyclic ring system: bis(2,3-epoxycyclopentyl)ether, 1,2-bis(2,3-epoxycyclopentyloxy)ethane, 3,4-epoxycyclohexyl-methyl 3,4-epoxycyclohexanecarboxylate, 3,4-epoxy-6-methyl-cyclohexylmethyl 3,4-epoxy-6-methyl-cyclohexanecarboxylate, di(3,4-epoxycyclohexylmethyl) hexanedioate, di(3,4-epoxy-6-methylcyclohexylmethyl)hexanedioate, ethylenebis(3,4-epoxycyclohexanecarboxylate), ethanediol di(3,4-epoxycyclohexylmethyl.

Highly preferred difunctional non-glycidyl epoxies include cycloaliphatic difunctional non-glycidyl epoxies, such as 3,4-epoxycyclohexyl-methyl 3',4'-epoxycyclohexanecarboxylate and 2,2'-bis-(3,4-epoxy-cyclohexyl)-propane, with the former being most preferred.

In another embodiment, the epoxy resin is a poly(N-glycidyl) compound or poly(S-glycidyl) compound. Poly(N-glycidyl) compounds are obtainable, for example, by dehydrochlorination of the reaction products of epichlorohydrin with amines containing at least two amine hydrogen atoms. These amines may be, for example, n-butylamine, aniline, toluidine, m-xylylenediamine, bis(4-aminophenyl)methane or bis(4-methylaminophenyl)methane. Other examples of poly(N-glycidyl) compounds include N,N'-diglycidyl derivatives of cycloalkyleneureas, such as ethyleneurea or 1,3-propyleneurea, and N,N'-diglycidyl derivatives of hydantoins, such as of 5,5-dimethylhydantoin. Examples of poly(S-glycidyl) compounds are di-S-glycidyl derivatives derived from dithiols, for example ethane-1,2-dithiol or bis(4-mercaptomethylphenyl)ether.

It is also possible to employ epoxy resins in which the 1,2-epoxide groups are attached to different heteroatoms or functional groups. Examples include the N,N,O-triglycidyl derivative of 4-aminophenol, the glycidyl ether/glycidyl ester of salicylic acid, N-glycidyl-N'-(2-glycidyloxypropyl)-5,5- dimethylhydantoin or 2-glycidyloxy-1,3-bis(5,5-dimethyl-1-glycidylhydantoin-3-yl)propane.

Other epoxide derivatives may also be employed, such as vinyl cyclohexene dioxide, limonene dioxide, limonene monoxide, vinyl cyclohexene monoxide, 3,4-epoxycyclohexlmethyl acrylate, 3,4-epoxy-6-methyl cyclohexylmethyl 9,10-epoxystearate, and 1,2-bis(2,3-epoxy-2-methylpropoxy)ethane.

Additionally, the epoxy resin may be a pre-reacted adduct of an epoxy resin, such as those mentioned above, with known hardeners for epoxy resins.

The curing agent component includes a reaction product obtained from the reaction of a liquid epoxy and a polyamine component. In one embodiment, the polyamine component consists of a cycloaliphatic polyamine compound having the formula (1)

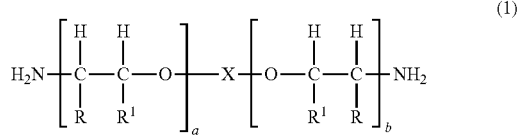

(1)

where R and $R^1$ are, in each instance independently of one another hydrogen or a linear or branched $C_1$-$C_5$ alkyl group; X is a $C_6$-$C_{20}$ cycloaliphatic radical; a is an integer from 1-5; and b is an integer from 1-5.

The cycloaliphatic polyamine compound of formula (1) may be prepared by methods known to those skilled in the art. For example, it can be prepared utilizing an initiator as a starting raw material that is charged to an alkoxylation reaction zone. The initiator may be any oxyalkylation susceptible polyhydric alcohol containing 2 to 4 hydroxyl groups. Examples of the initiator include: a diol such as a 1,3-diol including 1,3-propandiol, 1,3-butanediol, neopentyl glycol, 2-methyl-1,3-propanediol and 2,2,4-trimethyl-1,3-pentanediol, hexylenediol; a triol, such as trimethylolpropane and triethylolpropane; and a tetrol such as pentraerythritol.

After charging, the initiator is then contacted with an alkylene oxide in the alkoxylation reaction zone for a period of time sufficient to provide a precursor polyol. The alkylene oxide may be an alkylene oxide having the formula:

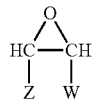

where Z and W are independently of one another hydrogen or a linear or branched $C_1$-$C_5$ alkyl group. Preferably, the alkylene oxide is ethylene oxide, propylene oxide, isobutylene oxide, 1,2-butylene oxide, 2,3-butylene oxide, pentylene oxide or styrene oxide. The amount of alkylene oxide which is contacted with the initiator may range from about 1.2-1.8 moles, and in some instances from about 1.4-1.6 moles, of alkylene oxide per mole of initiator. Additionally, the period of time the initiator is contacted with the alkylene oxide is a period of time sufficient to form the precursor polyol and in some instances may range from about 0.5 hours to about 24 hours.

The alkoxylation reaction zone can be a closed reaction vessel with alkoxylation being carried out under elevated temperature and pressure and in the presence of a base catalyst. For example, alkoxylation may be conducted at a temperature ranging from about 50° C. to about 150° C. and a pressure ranging from about 40 psi to about 100 psi. The base catalyst may be any alkaline compound customarily used for base-catalyzed reactions, for example, an alkali metal hydroxide such as sodium hydroxide, lithium hydroxide, potassium hydroxide, or cesium hydroxide, or a tertiary amine, such as dimethyl cyclohexylamine or 1,1,3,3-tetramethylguanidine. After alkoxylation, the resulting product may be vacuum stripped to remove any unnecessary components, such as excess unreacted alkylene oxide, water and/or base catalyst, while leaving the resulting precursor polyol.

The precursor polyol is then used as a feedstock for a reductive amination step. In some instances, prior to reductive amination, the precursor polyol is neutralized with acid or chemical adsorbent, such as for example, oxalic acid or magnesium silicate, and filtered for the removal of insoluble materials. The precursor polyol is charged to a reductive amination zone where it is brought into contact with a reductive amination catalyst, sometimes referred to as a hydrogenation-dehydrogenation catalyst, and reductively aminated in the presence of ammonia and hydrogen under reductive amination conditions. Reductive amination conditions may include, for example, a temperature within the range of about 150° C. to about 275° C. and a pressure within the range of about 500 psi to about 5000 psi with temperatures within the range of about 180° C. to about 220° C. and pressures within the range of about 1500 psi to about 2500 psi being used in many embodiments.

Any suitable hydrogenation catalyst may be used, such as those described in U.S. Pat. No. 3,654,370, the contents of which are incorporated herein by reference. In some embodiments, the hydrogenation catalyst may comprise one or more of the metals of group VIIIB of the Periodic Table, such as iron, cobalt, nickel, ruthenium, rhodium, palladium, platinum, mixed with one or more metals of group VIB of the Periodic Table such as chromium, molybdenum or tungsten. A promoter from group IB of the Periodic Table, such as copper, may also be included. As an example, a catalyst may be used comprising from about 60 mole percent to about 85 mole percent of nickel, about 14 mole percent to about 37 mole percent of copper and about 1 mole percent to about 5 mole percent of chromium (as chromia), such as a catalyst of the type disclosed in U.S. Pat. No. 3,152,998. As another example, a catalyst of the type disclosed in U.S. Pat. No. 4,014,933 may be used containing from about 70% by weight to about 95% by weight of a mixture of cobalt and nickel and from about 5% by weight to about 30% by weight of iron. As another example, a catalyst of the type disclosed in U.S. Pat. No. 4,152,353 may be used, comprising nickel, copper and a third component which may be iron, zinc, zirconium or a mixture thereof, for example, a catalyst containing from about 20% by weight to about 49% by weight of nickel, about 36% by weight to about 79% by weight of copper and about 1% by weight to about 15% by weight of iron, zinc, zirconium or a mixture thereof. As still another example, a catalyst of the type described in U.S. Pat. No. 4,766,245 may be used comprising about 60% by weight to about 75% by weight of nickel and about 25% by weight to about 40% by weight of aluminum.

The reductive amination is preferably conducted on a continuous basis with the precursor polyol, ammonia and hydrogen being continuously charged to a reactor containing a fixed bed of reductive amination catalyst and with product being continually withdrawn.

The product is suitably depressured so as to recover excess hydrogen and ammonia for recycle and is then fractionated to remove byproduct water of reaction and to provide the desired polyamine.

During reductive amination, the reductive amination conditions which can be utilized include the use of from about 4 moles to about 150 moles of ammonia per hydroxyl equivalent of precursor polyol feedstock. Hydrogen is preferably used in an amount ranging from about 0.5 mole equivalents to about 10 mole equivalents of hydrogen per hydroxyl equivalent of precursor polyol feedstock. The contact times within the reaction zone, when the reaction is conducted on a batch basis, may be within the range of from about 0.1 hours to about 6 hours and more preferably from about 0.15 hours to about 2 hours.

When the reaction is conducted on a continuous basis using catalyst pellets, reaction times may be from about 0.1 grams to about 2 grams of feedstock per hour per cubic centimeter of catalyst and, more preferably, from about 0.3 grams to about 1.6 grams of feedstock per hour per cubic centimeter of catalyst.

Also, the reductive amination may be conducted in the presence of about 1 mole to about 200 moles of ammonia per mole of precursor polyol and more preferably, from about 4 moles to about 130 moles of ammonia per mole of precursor polyol. From about 0.1 moles to about 50 moles of hydrogen per mole of precursor polyol may be employed and, more preferably, from about 1 mole to about 25 moles of hydrogen per mole of precursor polyol.

According to one embodiment, the liquid epoxy that is reacted with the polyamine component is an unmodified epoxy resin containing on average one or more epoxide groups. According to another embodiment, the liquid epoxy is an unmodified epoxy resin containing on average at least two epoxide groups. In still other embodiments, the liquid epoxy is an unmodified epoxy resin containing on average no more than ten epoxide groups, preferably no more than 4 epoxide groups, and even more preferably no more than 2.5 epoxide groups.

The unmodified epoxy resin may have a molecular weight that is relatively low, for example, a molecular weight that is less than about 5000, preferably less than about 3500, and more preferably less than about 2000. In another embodiment, the epoxy equivalent weight of the unmodified epoxy resin may range from about 100 g/eq to about 450 g/eq, preferably from about 150 g/eq to about 300 g/eq, and more preferably from about 175 g/eq to about 225 g/eq, and even more preferably from about 180 g/eq to about 200 g/eq. The term "epoxy equivalent weight", as used herein, denotes the reciprocal of the equivalents of the epoxy groups contained per gram of an epoxy compound and can be measured by any known determination method. Examples of such methods include infrared (IR) spectroscopy or the HCl-pyridine titration method through reaction with excess HCl in pyridine and titration of the remaining HCl with sodium methoxide, or titration in chloroform with perchloric acid in the presence of excess tetraethylammonium bromide and glacial acetic acid with an agitator of crystal violet (hexamethyl pararosaniline chloride, or by titrating a sample of the reaction product with tetrabutylammonium iodide and perchloric acid).

The unmodified epoxy resin may be a polyglycidyl ether of a polyhydric alcohol such as 1,4-butanediol or 1,3-propanediol or a polyglycidyl ether of a polyhydric phenol, for example a bisphenol such as bis(4-hydroxyphenyl)methane (bisphenol F) or 2,2-bis-(4-hydroxyphenyl)propane (bisphenol A) or a novolak formed from formaldehyde and a phenol such as phenol itself or a cresol, or a mixture of two or more such polyglycidyl ethers. Polyglycidyl ethers of bisphenol A are especially preferred.

In one embodiment, the unmodified epoxy resin is a polyglycidyl ether based on bisphenol A or bisphenol F and epichlorohydrin, having terminating 1,2-epoxide groups and an epoxy equivalent weight of between about 175 g/eq to about 225 g/eq and an epoxy value of between about 5 eq/kg to about 6 eq/kg.

According to another embodiment, the liquid epoxy may consist of one or more unmodified epoxy resins which are themselves liquid or may be a liquid mixture of one or more solid epoxy resins with one or more unmodified liquid epoxy resins or may be one or more solid epoxy resins dissolved in a monoepoxide, polyepoxide diluent or a non-epoxide diluent, such diluents known to those skilled in the art and conventionally used in epoxy resin compositions.

In some embodiments, the mole ratio of the polyamine component to the liquid epoxy used in forming the reaction product may range from about 1.5:1 to about 12:1. In other embodiments, the mole ratio of the polyamine component to liquid epoxy may range from about 4:1 to about 8:1.

The present disclosure further provides a method for preparing the curing agent component. According to one embodiment, the polyamine component is contacted with the liquid epoxy in the presence or absence of surfactant. The reaction may be performed at ambient temperature or higher temperatures. In one embodiment, the reaction is performed at a controlled temperature of between about 20° C.-150° C., and in some embodiments at a controlled temperature of between about 90° C.-110° C. The temperature during reaction is maintained for a time sufficient to form the reaction product containing active amine hydrogens.

The curing agent component can be formulated with or without solvent and stored separately from the curable component to form the two-component curable system. Thus, in yet another embodiment there is provided a method for preparing a two-component curable system including (1) providing the curable component comprising the epoxy resin in one container and (2) providing the curing agent component containing the reaction product obtained from the reaction of the polyamine component and liquid epoxy and optionally a solvent in a second container. The amount of curing agent component used in the two-component system is an amount sufficient to cure the curable component and form a continuous coating. In one embodiment, the amounts of the curing agent component and curable component used in the curable systems are such that the ratio of epoxy equivalents in the curable component to amine equivalents in the curing agent component is from 0.5:1 to 2:1; in some instances from 0.6:1.4 to 1.4:0.6; and in more instances from 0.8:1.2 to 1.2:0.8 and even more instances from 0.9:1.1 to 1.1:0.9.

If desired, either one or both of the curable component and curing agent component may be mixed with one or more customary additives, for example, a stabilizer, extender, filler, reinforcing agent, pigment, dyestuff, plasticizer, tackifier, rubber, accelerator, diluent or any mixture thereof prior to storage or use.

Stabilizers which may be employed include: phenothiazine itself or C-substituted phenothiazines having 1 to 3 substituents or N-substituted phenothiazines having one substituent for example, 3-methyl-phenothiazine, 3-ethyl-phenothiazine, 10-methyl-phenothiazine; 3-phenyl-phenothiazine, 3,7-diphenyl-phenothiazine; 3-chlorophenothiazine, 2-chlorophenothiazine, 3-bromophenothiazine, 3-nitrophenothiazine, 3-aminophenothiazine, 3,7-diaminophenothiazine; 3-sulfonyl-phenothiazine, 3,7-disulfonylphenothiazine, 3,7-dithiocyanatophenthiazin; substituted quinines and catechols, copper naphthenate, zinc-dimethyldithiocarbonate and phosphotungistic acid hydrate. Extenders, reinforcing agents, fillers accelerators and pigments which can be employed include, for example: coal tar, bitumen, glass fibers, boron fibers, carbon fibers, cellulose, polyethylene powder, polypropylene powder, mica, asbestos, quartz powder, gypsum, antimony trioxide, bentones, silica aerogel ("aerosil"), lithopone, barite, titanium dioxide, eugenol, dicummyl peroxide, isoeugenol, carbon black, graphite, and iron powder. It is also possible to add other additives, for example, flameproofing agents, flow control agents such as silicones, cellulose acetate butyrate, polyvinyl butyrate, waxes, stearates and the like (which are in part also used as mold release agents).

In another embodiment, the present disclosure provides a method of forming a coating from the two component curable system. The method includes contacting the curing agent component with the curable component, applying the mixture to a substrate, and subjecting the mixture to curing conditions to cure the mixture and form a coating, such curing conditions being either under ambient conditions and/or under heat.

Thus, in one embodiment, the mixture may be allowed to cure at ambient conditions for any period of time sufficient to allow it to harden, such as, for example from 1 minute to about 10 days. In another embodiment, in order to achieve more rapid and/or more complete curing, the mixture obtained from the two component system according to the present disclosure is heated at 50° C. to 120° C. for a any period of time, such as for about 1 minute to about 24 hours. The mixture may be applied to (by methods known to those skilled in the art) and cured upon any substrate or article. Thus, in yet another embodiment there is provided an article or substrate coated with the two component system of the present disclosure.

According to one particular embodiment, the two component system is used as a protective coating for a substrate. The curing agent component may be applied to one or more surfaces of a substrate, prior to, subsequently to, or simultaneously with the curable component, at a desired thickness by methods well known to those skilled in the art, such as, spraying, dipping, brushing, painting, roller coating, etc. After application, the coating is cured at ambient conditions and/or by the application of heat. The substrate may be, but is not limited to, cement, metal, concrete, brick, cement board, ceramic, wood, fiber, glass, plastic or SHEETROCK® plaster wall board. The two part curable composition may be used as either a primer, mid- or topcoat coating or surface protectant.

According to another embodiment, the two component system is used as an adhesive to bond at least two substrates together. The method includes:
  i. providing a part (A) containing a curable component comprising an epoxy resin;
  ii. providing a part (B) containing a curing agent component comprising a reaction product obtained from the reaction of a liquid epoxy and a polyamine component consisting of a cycloaliphatic polyamine compound;
  iii. contacting parts (A) and (B) to form a mixture;
  iv. applying the mixture to at least one surface of one or more of the substrates; and
  v. matingly engaging the surfaces of the substrates which are to be bonded together permitting the mixture to cure to form a bond there between.

It is generally contemplated that the two components will be mixed in about a 1:1 ratio by volume, but the ratio will depend on the components contained in each part and therefore may vary. Thus, in some embodiments, part (A) and part (B) may be mixed in about a 5:1 to 1:5 ratio by volume, while in other embodiments part (A) and part (B) may be mixed in about a 10:1 to 1:10 ratio by volume.

In one embodiment, parts (A) and (B), after mixing, are applied to the surface of at least one substrate, such as by brushing, rolling, spraying, dotting, or kniving. The surface may be untreated, oily, etc. The substrates to be adhered may be clamped for firmness during cure in those installations where relative movement of the substrates might be expected. For example, to adhere two substrate surfaces, an adherent quantity of the mixture is applied to at least one surface, preferably to both surfaces, and the surfaces are contacted with the mixture therebetween. The smoothness of the surfaces and their clearance will determine the required film thickness for optimum bonding. The surfaces and the interposed mixture are then maintained in engagement until the mixture has cured sufficiently to bond the surfaces. Examples of substrates which the curable composition may be applied to include, but are not limited to, steel, galvanized steel, aluminum, copper, brass, wood, glass, paper, composites, ceramics, plastics and polymeric materials such as polyester, polyamide, polyurethane, polyvinyl chloride, polycarbonates, ABS plastics, and plexiglass.

EXAMPLES

Example 1

Reaction products were obtained from the reaction of isophorone diamine and a polyamine component consisting of a cycloaliphatic polyamine compound (Jeffamine® RFD 270 polyamine) with a liquid epoxy (Araldite® GY 6010 epoxy). These reaction products were then used to cure an epoxy resin at ambient conditions. The two component systems provided the following properties.

TABLE 1

| Parameter | Isophorone Diamine Based Curing Agent | Polyamine Component Based Curing Agent |
| --- | --- | --- |
| Epoxy Resin (g) | 100 | 100 |
| Curing Agent (g) | 60 | 73 |
| Mixed viscosity at 25° C. (cP) | 2400 | 2400 |
| Gel time, 100 g at 23° C. (min) | 55 | 91 |

TABLE 2

| Curing Properties at 23° C./50% Relative Humidity | Isophorone Diamine Based Curing Agent | Polyamine Component Based Curing Agent |
| --- | --- | --- |
| Tack Free Time (hr) | 4.75 | 4.25 |
| Cure-through Time (hr) | 7.75 | 7.0 |
| Film Appearance | Glossy, no blush | Glossy, no blush |
| Cure-through Time/Gel Time | 8.4 | 4.6 |

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A two component curable system comprising:
(A) a curable component comprising an epoxy resin; and
(B) a curing agent component comprising a reaction product obtained from the reaction of a liquid epoxy and a polyamine component consisting of a cycloaliphatic polyamine compound having the formula (1)

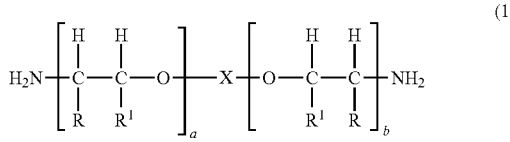

where R and $R^1$ are, in each instance independently of one another hydrogen or a linear or branched $C_1$-$C_5$ alkyl group; X is a $C_6$-$C_{20}$ cycloaliphatic radical; a is an integer from 1-5; and b is an integer from 1-5.

2. The two component curable system of claim 1 wherein the liquid epoxy is an unmodified epoxy resin containing on average no more than four epoxide groups.

3. The two component curable system of claim 2 wherein the unmodified epoxy resin has an epoxy equivalent weight ranging from about 100 g/eq to about 450 g/eq.

4. The two component curable system of claim 2 wherein the unmodified epoxy resin has an epoxy equivalent weight ranging from about 175 g/eq to about 225 g/eq.

5. The two component curable system of claim 2 wherein the unmodified epoxy resin is a polyglycidyl ether based on bisphenol A or bisphenol F and epichlorohydrin, having terminating 1,2-epoxide groups and an epoxy equivalent weight between about 175 to about 225 and an epoxy value of between about 5 eq/kg to about 6 eq/kg.

6. A two component curable system comprising:
(A) a curable component comprising an epoxy resin; and
(B) a curing agent component comprising a reaction product obtained from the reaction of a liquid epoxy and a polyamine component consisting of a cycloaliphatic polyamine compound having the formula (1)

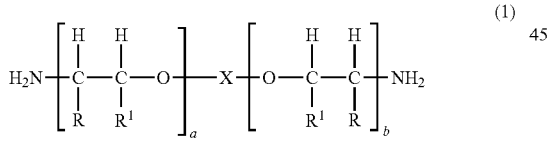

where R and $R^1$ are, in each instance independently of one another hydrogen or a linear or branched $C_1$-$C_5$ alkyl group; X is a $C_6$-$C_{20}$ cycloaliphatic radical; a is an integer from 1-5; and b is an integer from 1-5 and wherein after contacting components (A) and (B) exhibits a ratio of cure-through time to gel time of less than about 6.

7. The two component curable system of claim 6 wherein after contacting components (A) and (B) exhibits a ratio of cure-through time to gel time of less than about 5.

8. A method for preparing a two-component curable system comprising:
providing a curable component comprising an epoxy resin in one container; and providing a curing agent component comprising a reaction product obtained from the reaction of a liquid epoxy and a polyamine component consisting of a cycloaliphatic polyamine compound having the formula (1)

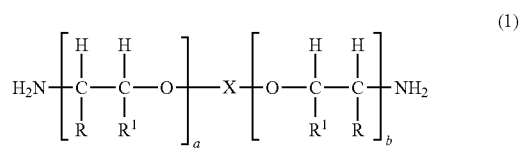

where R and $R^1$ are, in each instance independently of one another hydrogen or a linear or branched $C_1$-$C_5$ alkyl group; X is a $C_6$-$C_{20}$ cycloaliphatic radical; a is an integer from 1-5; and b is an integer from 1-5 and optionally a solvent in a second container.

9. A method of forming a coating from a two component curable system comprising the steps of: contacting a curable component comprising an epoxy resin with a curing agent component comprising a reaction product obtained from the reaction of a liquid epoxy and a polyamine component consisting of a cycloaliphatic polyamine compound having the formula (1)

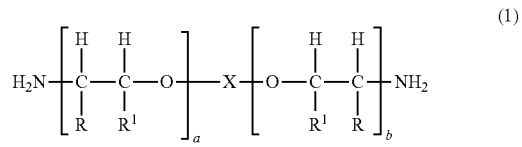

where R and $R^1$ are, in each instance independently of one another hydrogen or a linear or branched $C_1$-$C_5$ alkyl group; X is a $C_6$-$C_{20}$ cycloaliphatic radical; a is an integer from 1-5; and b is an integer from 1-5 and optionally a solvent to form a mixture; and subjecting the mixture to curing conditions to cure the mixture.

10. A method for forming a protective coating on a substrate comprising: applying a curing agent component comprising a reaction product obtained from the reaction of a liquid epoxy and a polyamine component consisting of a cycloaliphatic polyamine compound having the formula (1)

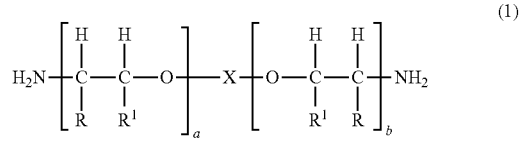

where R and $R^1$ are, in each instance independently of one another hydrogen or a linear or branched $C_1$-$C_5$ alkyl group; X is a $C_6$-$C_{20}$ cycloaliphatic radical; a is an integer from 1-5; and b is an integer from 1-5 and optionally a solvent to one or more surfaces of a substrate, prior to, subsequently to, or simultaneously with a curable component comprising an epoxy resin to form a coating and curing the coating at ambient conditions and/or by application of heat.

11. The method of claim 10 wherein the substrate is cement, metal, concrete, brick, cement board, ceramic, wood, fiber, glass, plastic or plaster wall board.

12. A method of bonding at least two substrates together comprising:
i. providing a part (A) containing a curable component comprising an epoxy resin;
ii. providing a part (B) containing a curing agent component comprising a reaction product obtained from the reaction of a liquid epoxy and a polyamine component consisting of a cycloaliphatic polyamine compound having the formula (1)

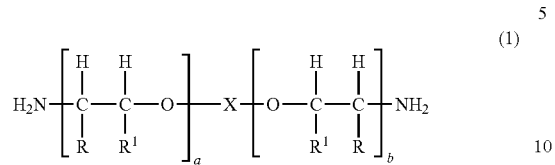

where R and $R^1$ are, in each instance independently of one another hydrogen or a linear or branched $C_1$-$C_5$ alkyl group; X is a $C_6$-$C_{20}$ cycloaliphatic radical; a is an integer from 1-5; and b is an integer from 1-5;
  iii. contacting parts (A) and (B) to form a mixture;
  iv. applying the mixture to at least one surface of one or more of the substrates; and
  v. matingly engaging the surfaces of the substrates which are to be bonded together permitting the mixture to cure to form a bond there between.

* * * * *